United States Patent
Perumalsamy et al.

(10) Patent No.: US 8,735,336 B1
(45) Date of Patent: May 27, 2014

(54) ECO-FRIENDLY CLEANERS FOR OILFIELD EQUIPMENT

(71) Applicants: Jayachandran Perumalsamy, Houston, TX (US); Colby Tate, Houston, TX (US)

(72) Inventors: Jayachandran Perumalsamy, Houston, TX (US); Colby Tate, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/769,676

(22) Filed: Feb. 18, 2013

(51) Int. Cl.
*C11D 3/37* (2006.01)
(52) U.S. Cl.
USPC ........... 510/188; 510/230; 510/318; 510/361; 510/364; 510/365; 510/398; 510/470; 510/476
(58) Field of Classification Search
USPC ......... 510/188, 230, 318, 361, 364, 365, 398, 510/470, 476; 507/200, 203; 166/311; 134/22.14
See application file for complete search history.

(56) References Cited

U.S. PATENT DOCUMENTS

| 8,227,381 B2 | 7/2012 | Rodrigues et al. | |
|---|---|---|---|
| 2011/0136718 A1* | 6/2011 | Rodrigues et al. | 510/230 |
| 2012/0004147 A1* | 1/2012 | Seetz et al. | 507/211 |
| 2012/0128608 A1* | 5/2012 | Rodrigues et al. | 424/59 |

OTHER PUBLICATIONS

Alcoguard® H 5240 Technical Information.
Baraklean® Technical Information.
Baraklean® Dual Technical Information.
Baraklean® Gold Technical Information.
Frenier, Wayne W., Paper No. 338: "20 Years of Advances in Technology for Chemically Cleaning Industrial Equipment: A Critical Review," pp. 1-63.

\* cited by examiner

*Primary Examiner* — Charles Boyer
(74) *Attorney, Agent, or Firm* — Haynes and Boone, LLP

(57) ABSTRACT

Methods for removing an organic material from a portion of oilfield equipment are described. The methods include forming a composition that includes a hybrid polymer and introducing the composition to the portion of the oilfield equipment from which the organic material is to be removed. The hybrid polymer includes a synthetic component formed from at least one or more olefinically unsaturated carboxylic acid monomers or salts thereof, and a natural component formed from a hydroxyl-containing natural moiety.

9 Claims, No Drawings

ECO-FRIENDLY CLEANERS FOR OILFIELD EQUIPMENT

BACKGROUND

The present invention relates generally to methods of using environmentally friendly compositions for cleaning oilfield equipment.

The efficient recovery of oil and gas from wells depends on maintaining clean formations, casing perforations, lines and pumping equipment. Oil wells have a problem with the buildup of paraffin, sulfur, scale, mud, heavy oil, and tar by-products. These residues foul the wells, the casing perforations and the lines that carry oil or gas to the surface, and foul the pumps and metal rods which are used to recover the oil or gas from the well. Failure to clean the equipment can result in contamination of the oil or gas.

Products that are used to clean oilfield equipment typically include chemicals that can adversely affect worker health and the environment, adversely affect the quality of the oil or gas, and/or require expensive disposal. Although many types of cleaners have been used, there is a continuing need for improved cleaners that effectively remove organic material, are inexpensive, and are biodegradable and less toxic than traditional cleaning products.

DETAILED DESCRIPTION

The present invention provides methods of using environmentally friendly cleaning compositions for removing organic material from oilfield equipment, including casing, pumps, tanks, lines, pipes, and the like. The oilfield equipment includes all types and varieties of equipment associated with gas and oil recovery and processing. The methods described herein may be used with all such equipment.

The compositions are safe and biodegradable and used to clean equipment that has been fouled in normal drilling operations. During drilling, equipment is exposed to a variety of organic materials including, for example, olefins, internal olefin based oils, mineral oils, kerosene, diesel oils, fuel oils, synthetic oils, linear or branched paraffins, esters, acetals, crude oils, muds, or mixtures thereof. The drilling fluid typically includes a mud. Drilling muds normally include liquid (water, oil, or both), noncolloidal solids (sand, iron ore, barite, hematite), colloidal solids (clays, organic colloids), and dissolved chemicals (mineral lignin, barium carbonate, sodium bicarbonate, formaldehyde, etc.).

The compositions used according to certain embodiments of the present invention contain a hybrid polymer in amounts effective to clean the equipment. The hybrid polymer provides the performance of synthetic polymers while making use of lower cost, readily available and environmentally friendly materials derived from renewable sources. The hybrid polymer includes a synthetic component formed from at least one or more olefinically unsaturated carboxylic acid monomers or salts thereof, and a natural component formed from a hydroxyl-containing natural moiety.

The olefinically unsaturated carboxylic acid monomers include, for example, aliphatic, branched or cyclic, mono- or dicarboxylic acids, the alkali or alkaline earth metal or ammonium salts thereof, and the anhydrides thereof. Examples of such olefinically unsaturated carboxylic acid monomers include but are not limited to acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, and 2-acryloxypropionic acid. Moieties such as maleic anhydride or acrylamide that can be derivatized to an acid containing group can also be used. Moreover, combinations of olefinically unsaturated carboxylic acid monomers may be used. In one embodiment, the olefinically unsaturated carboxylic acid monomer is acrylic acid, maleic acid, itaconic acid, or methacrylic acid, or mixtures thereof.

The hydroxyl-containing natural moiety of the hybrid can be water soluble. The hydroxyl-containing natural moiety ranges from small molecules such as glycerol, citric acid, lactic acid, tartaric acid, gluconic acid, glucoheptonic acid, monosaccharides and disaccharides such as sugars, to larger molecules such as oligosaccharides and polysaccharides (e.g., maltodextrins and starches). Examples of these include sucrose, fructose, maltose, glucose, and saccharose, as well as reaction products of saccharides such as mannitol, sorbitol and so forth. Monosaccharides and oligosaccharides such as galactose, mannose, sucrose, ribose, trehalose, lactose, etc., can be used.

Useful polysaccharides can also be derived from plant, animal and microbial sources. Examples of such polysaccharides include starch, cellulose, gums (e.g., gum arabic, guar and xanthan), alginates, pectin and gellan. Starches include those derived from maize and conventional hybrids of maize, such as waxy maize and high amylose (greater than 40% amylase) maize, as well as other starches such as potato, tapioca, wheat, rice, pea, sago, oat, barley, rye, and amaranth, including conventional hybrids or genetically engineered materials. Also included are hemicellulose or plant cell wall polysaccharides such as D-xylans. Examples of plant cell wall polysaccharides include arabino-xylans such as corn fiber gum, a component of corn fiber.

Other useful polysaccharides include maltodextrins, which are polymers having D-glucose units linked primarily by α-1,4 bonds and a dextrose equivalent ("DE") of less than about 20. Dextrose equivalent is a measure of the extent of starch hydrolysis. It is determined by measuring the amount of reducing sugars in a sample relative to dextrose (glucose). The DE of dextrose is 100, representing 100% hydrolysis. The DE value gives the extent of hydrolysis (e.g., 10 DE is more hydrolyzed than 5 DE maltodextrin). Maltodextrins are available as a white powder or concentrated solution and are prepared by the partial hydrolysis of starch with acid and/or enzymes.

Other suitable polysaccharides include corn syrups or corn syrup solids. Corn syrups are defined as degraded starch products having a DE of 27 to 95. Examples of specialty corn syrups include high fructose corn syrup and high maltose corn syrup.

Polysaccharides can be modified or derivatized by etherification (e.g., via treatment with propylene oxide, ethylene oxide, 2,3-epoxypropyl trimethyl ammonium chloride), esterification (e.g., via reaction with acetic anhydride, octenyl succinic anhydride ("OSA")), acid hydrolysis, dextrinization, oxidation or enzyme treatment (e.g., starch modified with α-amylase, β-amylase, pullanase, isoamylase or glucoamylase), or various combinations of these treatments.

The present invention uses hybrid polymers having a high degree of the natural component or constituent. The weight percent of the natural component in the hybrid polymer can be about 50 weight percent or greater based on total weight of the hybrid polymer. Examples of the natural component include glycerol, citric acid, maltodextrins, pyrodextrins, corn syrups, maltose, sucrose, low molecular weight oxidized starches and mixtures thereof.

The hybrid polymers perform similar to their synthetic counterparts, even at relatively high levels of the natural component within the hybrid polymer. For example, the natural component of the hybrid polymer can be from about 10 to about 95 weight percent based on total weight of the polymer. In one embodiment, the range is from about 20 to about 85 weight percent of the natural component based on total weight of the polymer. In another embodiment, the weight percent of the natural component in the hybrid polymer is about 40 weight percent or greater based on total weight of the polymer. In yet another embodiment, the weight percent of the natural component in the hybrid polymer is about 60 weight percent or greater. In still another embodiment, the weight percent of the natural component in the hybrid polymer is about 80 weight percent or greater.

As a result of the larger weight percent of natural component in the hybrid polymer, the hybrid polymer has a significantly lower carbon footprint than traditional petrochemical based polymers. The hybrid polymers also biodegrade, which makes them an environmentally friendly alternative to traditional polymers and reduces handling issues with other liquids.

The chemical structure of an exemplary embodiment of the hybrid polymer is shown below. In an exemplary embodiment, the hybrid polymer includes the Alcosperse® H 7040 product (formerly Alcoguard® H 5240 product), which is commercially available from AkzoNobel®.

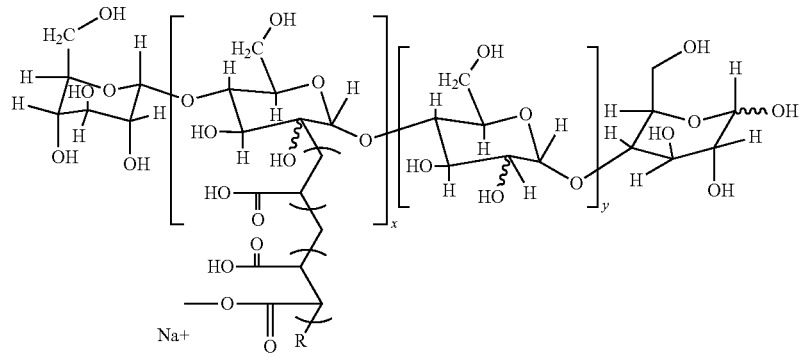

It has been discovered that the hybrid polymers described herein are particularly effective in removing oil-based drilling fluids and other contaminants on oilfield equipment, including hydrocarbon substances such as diesel oil, crude oil and other naturally occurring formation fluids. The hybrid polymers can be effectively used to clean drilling equipment such as mud pumps, tanks and flow lines. The hybrid polymers have demonstrated the ability to disperse and solubilize oil-based drilling muds and other organic materials commonly deposited on oilfield equipment.

Compositions including the hybrid polymers are useful for surface cleaning operations and environmentally sensitive applications. They remove grease and oil-based compounds, e.g., oil-based drilling fluid residues, clean rig floors and equipment, degrease shop floors, clean casing, emulsify oil, remove polar solids, and leave surfaces water wet.

In one embodiment, the hybrid polymer is soluble in water, and is diluted with water before use. The hybrid polymer can be present in an aqueous composition in an amount of from about 40 to 50 weight percent based on total weight of the cleaning composition. The amount of water present in the compositions is about 50 to 60 weight percent based on the total weight of the composition.

Once the compositions are prepared, they can be introduced to oilfield equipment that needs cleaning. In one embodiment, a high pressure hose is used to introduce the compositions to the equipment during surface cleaning operations.

Example 1

Cleaning Efficiency Test

The ability of a composition of Alcosperse® H 7040 product to solubilize a viscous layer of mud was investigated and compared to a conventional BARAKLEAN® casing cleaner. BARAKLEAN® casing cleaner is commercially available from Baroid Fluid Services. The mud used was a 12 ppg Inverse Emulsion Fluid (IEF) (DURATONE-E lab standard additive mud system) The DURATONE-E lab standard mud system contains the following:

TABLE I

| Fluid components | Unit | Amount of loading |
| --- | --- | --- |
| Diesel Fuel | ml | 168 |
| INVERMUL ® NT | grams | 12 |
| Lime | Grams | 6 |

TABLE I-continued

| Fluid components | Unit | Amount of loading |
| --- | --- | --- |
| DURATONE ® E | Grams | 15 |
| EZ MUL ® NT | Grams | 6 |
| Tap water | Grams | 42 |
| GELTONE ® V | Grams | 3 |
| BAROID ® Weighting Material | Grams | 530 |
| Calcium chloride Dehydrate | Grams | 25 |

The cleaning evaluation was performed at 80° F. to simulate the casing cleaner environment. Pre-dried and weighed sleeves of a Fann 35 rheometer were carefully submerged in the mud for 30 seconds up to a mark, and excess mud was allowed to drain out for 2 minutes. Then 300 mL of the Alcosperse® H 7040 product and BARAKLEAN® casing cleaner were each measured into a 400 mL beaker that was cleaned and dried. The Fann 35 regular rheometer was lowered into each of the cleaning compositions, and the rheometer started at the shear (300 rpm) for 10 minutes (contact time). After 10 minutes, each sleeve was removed from the rheometer gently and washed with about 30 mL of distilled water. Each beaker was rinsed with isopropyl alcohol, and then dried at 105° C. for 4 hours. The cleaning efficiency of both cleaning systems were then measured and compared. The results are shown below in Tables I and II.

TABLE II

Formulation: 12 ppg IEF (DURATONE-E)
Contact time 10 minutes, 300 rpm
Fann 35 A (Instrument ID# Q0240 and Q0008-
Calibration due-August 2012)
Mud Immersion Time = 30 seconds
Excess mud removal time = 2 min
For BARAKLEAN ® Testing

| Sleeve wt. | Sleeve + Mud | Mud | Sleeve + Mud, Dried | Mud, Dry | % Mud Removed |
|---|---|---|---|---|---|
| 140.1456 | 142.2215 | 2.0759 | 140.6095 | 0.4639 | 77.7% |
| 139.3735 | 141.5135 | 2.14 | 139.7879 | 0.4144 | 80.6 |
|  |  |  |  |  | Ave = 79.2% |

TABLE III

Formulation: 12 ppg IEF (DURATONE-E)
Contact time 10 minutes, 300 rpm
Fann 35 A (Instrument ID# Q0240 and Q0008-
Calibration due-August 2012)
Mud Immersion Time = 30 seconds
Excess mud removal time = 2 min
For Alcosperse ® H 7040 Testing

| Sleeve wt. | Sleeve + Mud | Mud | Sleeve + Mud, Dried | Mud, Dry | % Mud Removed |
|---|---|---|---|---|---|
| 139.3718 | 142.4251 | 3.0533 | 139.9445 | 0.5727 | 81.2 |
| 140.1461 | 142.8670 | 2.7209 | 140.7030 | 0.5569 | 79.5 |
|  |  |  |  |  | Ave = 80.4% |

The test shows that the cleaning efficiency of the Alcosperse® H 7040 product (80.4%) is superior to that of the BARAKLEAN® casing cleaner (79.2%). The Alcosperse® H 7040 product is an environmentally acceptable green chemical, and a considerable amount is biodegradable. Moreover, it was observed that the Alcosperse® H 7040 product did not foam during cleaning, and that it cleaned both the inner and outer surfaces of the sleeve more evenly compared to the BARAKLEAN® casing cleaner.

Although only a few exemplary embodiments have been described in detail above, those skilled in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method for removing an organic material from a portion of oilfield equipment comprising:
   forming a composition comprising about 40-50 weight percent of a hybrid polymer and about 50-60 weight percent of water, wherein the hybrid polymer comprises:
   a synthetic component formed from at least one or more olefinically unsaturated carboxylic acid monomers or salts thereof, wherein the olefinically unsaturated carboxylic acid monomers comprise maleic acid monomers; and
   a natural component formed from a hydroxyl-containing natural moiety, wherein the natural component comprises a polysaccharide and wherein the polysaccharide is maltodextrin;
   wherein the hybrid polymer comprises at least about 60 weight percent of the natural component; and
   introducing the composition to the portion of the oilfield equipment from which the organic material is to be removed.

2. The method of claim 1, wherein the olefinically unsaturated carboxylic acid monomer is further comprises a carboxylic acid monomer selected from the group consisting of acrylic acid, methacrylic acid, itaconic acid, and mixtures thereof.

3. The method of claim 1, wherein the natural component further comprises corn syrup solids.

4. The method of claim 1, wherein the weight percent of the natural component in the hybrid polymer is about 80 weight percent or more based on the total weight of the hybrid polymer.

5. The method of claim 1, wherein the organic material comprises an olefin, internal olefin based oil, mineral oil, kerosene, diesel oil, fuel oil, synthetic oil, linear or branched paraffin, ester, acetal, crude oil, mud, or mixtures thereof.

6. The method of claim 1, wherein the oilfield equipment comprises a casing.

7. The method of claim 6, wherein the organic material from both inner and outer surfaces of the casing are removed.

8. The method of claim 1, wherein the composition is introduced to the oilfield equipment during surface cleaning operations.

9. The method of claim 1, wherein the composition does not produce a foam when it is introduced to the oilfield equipment.

* * * * *